United States Patent
Hsieh et al.

(10) Patent No.: US 12,480,231 B2
(45) Date of Patent: Nov. 25, 2025

(54) MANUFACTURING METHOD FOR CARBON FIBER

(71) Applicant: FORMOSA PLASTICS CORPORATION, Kaohsiung (TW)

(72) Inventors: Chia-Chun Hsieh, Kaohsiung (TW);
Kun-Yeh Tsai, Kaohsiung (TW);
Ching-Wen Chen, Kaohsiung (TW);
Chia-Chi Hung, Kaohsiung (TW);
Wen-Ju Chou, Kaohsiung (TW);
Long-Tyan Hwang, Kaohsiung (TW)

(73) Assignee: FORMOSA PLASTICS CORPORATION, Kaohsiung (TW)

(*) Notice: Subject to any disclaimer, the term of this patent is extended or adjusted under 35 U.S.C. 154(b) by 706 days.

(21) Appl. No.: 17/871,018

(22) Filed: Jul. 22, 2022

(65) Prior Publication Data

US 2023/0023765 A1     Jan. 26, 2023

(30) Foreign Application Priority Data

Jul. 23, 2021 (TW) .................. 110127260

(51) Int. Cl.
*D01F 11/14* (2006.01)
*D01F 9/24* (2006.01)

(52) U.S. Cl.
CPC ............ *D01F 11/14* (2013.01); *D01F 9/24* (2013.01); *D10B 2101/12* (2013.01)

(58) Field of Classification Search
None
See application file for complete search history.

(56) References Cited

U.S. PATENT DOCUMENTS

| | | |
|---|---|---|
| 10,550,512 B2 | 2/2020 | Aso et al. |
| 2017/0284016 A1 | 10/2017 | Aso et al. |

FOREIGN PATENT DOCUMENTS

| | | |
|---|---|---|
| CN | 101876096 A | 11/2010 |
| CN | 102477159 A | 5/2012 |
| CN | 107938356 A | 4/2018 |
| CN | 111139555 A | 5/2020 |
| CN | 112424418 A | 2/2021 |
| JP | 60-173169 A | 9/1985 |
| JP | S60173169 A | 9/1985 |
| JP | 2002-371476 A | 12/2002 |
| JP | 2005290363 A | 10/2005 |
| JP | 2006-183159 A | 7/2006 |
| JP | 2018-145562 A | 9/2018 |
| JP | 2021-25042 A | 2/2021 |

*Primary Examiner* — Yun Qian
(74) *Attorney, Agent, or Firm* — Muncy, Geissler, Olds & Lowe, P.C.

(57) ABSTRACT

A manufacturing method for a carbon fiber includes: performing an emulsification step that includes uniformly mixing a silicone oil composition and an emulsifier to form an oiling agent, in which the silicone oil composition includes γ-divinyltriamine propylmethyldimethoxyl silane and N-(β-aminoethyl)-γ-aminopropylmethylbimethoxy silane; performing an oiling step that includes soaking a carbon raw filament in the oiling agent, such that the oiling agent is adhered to a surface of the carbon raw filament to form a carbon fiber precursor; and performing a calcination step on the carbon fiber precursor, such that the carbon fiber is formed.

9 Claims, 2 Drawing Sheets

MANUFACTURING METHOD FOR CARBON FIBER

CROSS-REFERENCE TO RELATED APPLICATION

This application claims priority to Taiwan Application Serial Number 110127260, filed Jul. 23, 2021, which is herein incorporated by reference.

BACKGROUND

Field of Disclosure

The present disclosure relates to a manufacturing method for a carbon fiber.

Description of Related Art

In recent years, with the rising awareness of environmental protection, energy saving, and high efficiency, the demand for carbon fiber is getting higher. Since carbon fiber has the advantages of high fatigue resistance, high thermal conductivity, low friction coefficient, high lubricity, low thermal expansion coefficient, high corrosion resistance, high X-ray transmittance, and specific heat and electrical conductivity between non-metals and metals, etc., it is widely used in fields such as industry, sports, civil construction, transportation, energy, aerospace and military. However, in the manufacturing process of carbon fibers, the mechanical strength, other physical properties, and other chemical properties of different carbon fibers are different based on the difference of precursors, process, and carbonization conditions.

In the manufacturing process of the carbon fiber, almost all the fiber precursors are drafted under a heated environment, and the calcination of the protofilaments is also carried out in a high-temperature environment; however, the high temperature easily causes the protofilaments to soften, even further, causes single fibers to stick. In addition, the protofilaments will contact and rub against the surface of the roller during transportation, resulting in hairiness and other defects, which will reduce the quality of carbon fibers. In order to prevent the above situation from happening, the most commonly used method is to make the oiling agent attach to the surface of the protofilaments to form a protective film. However, since the commonly used oiling agent is difficult to withstand high temperature, some modified oiling agents have gradually developed. However, the modified oiling agent still has problems such as poor film formation, poor heat resistance, poor stability, poor hydrophilicity, and complicated manufacturing process. Based on the above, how to provide an oiling agent that can overcome the above problems is an important issue actively researched by those skilled in the art.

SUMMARY

According to some embodiments of the present disclosure, a manufacturing method for a carbon fiber includes: performing an emulsification step that includes uniformly mixing a silicone oil composition and an emulsifier to form an oiling agent, in which the silicone oil composition includes γ-divinyltriamine propylmethyldimethoxy silane and N-(β-aminoethyl)-γ-aminopropylmethylbimethoxy silane; performing an oiling step that includes soaking a carbon raw filament in the oiling agent, such that the oiling agent is adhered to a surface of the carbon raw filament to form a carbon fiber precursor; and performing a calcination step on the carbon fiber precursor, such that the carbon fiber is formed.

In some embodiments of the present disclosure, a weight ratio of the γ-divinyltriamine propylmethyldimethoxyl silane and the N-(β-aminoethyl)-γ-aminopropylmethylbimethoxy silane ranges from 7:3 and 8:2.

In some embodiments of the present disclosure, when carrying out a thermogravimetric analysis on the oiling agent in air, a weight of the oiling agent at a temperature of 273° C. to 277° C. is greater than 90% to 95% of an original weight of the oiling agent.

In some embodiments of the present disclosure, a weight of the oiling agent at a temperature of 428° C. to 432° C. is greater than 80% to 85% of the original weight of the oiling agent.

In some embodiments of the present disclosure, during the oiling step, an oil attachment ratio of the oiling agent ranges from 0.5% to 0.8%.

In some embodiments of the present disclosure, the manufacturing method for a carbon fiber further includes: performing a mixing step that includes uniformly mixing the γ-divinyltriamine propylmethyldimethoxyl silane and the N-(β-aminoethyl)-γ-aminopropylmethylbimethoxy silane at a rotational speed of 300 rpm to 1000 rpm to form the silicone oil composition.

In some embodiments of the present disclosure, the mixing step is performed at a temperature of 50° C. to 65° C.

In some embodiments of the present disclosure, the emulsification step further includes: uniformly mixing the silicone oil composition, the emulsifier, and a deionized water to form the oiling agent, in which a weight ratio of the silicone oil composition, the emulsifier, and the deionized water is (12 to 40):(3 to 15):(45 to 85).

In some embodiments of the present disclosure, the emulsifier includes a nonionic surfactant, a cationic surfactant, an anionic surfactant, or combinations thereof.

In some embodiments of the present disclosure, the nonionic surfactant includes a block copolymer of polyoxyethylene ether and polyoxypropylene ether, a block copolymer of tristyrylphenol ethoxylates and ethylene oxide, a block copolymer of tristyrylphenol ethoxylates and propylene oxide, or combinations thereof.

According to some other embodiments of the present disclosure, a manufacturing method for a carbon fiber includes: performing an emulsification step that includes uniformly mixing a silicone oil composition and an emulsifier to form an oiling agent, in which the silicone oil composition includes at least two amine-modified silanes; performing an oiling step that includes soaking a carbon raw filament in the oiling agent, such that the oiling agent is adhered to a surface of the carbon raw filament to form a carbon fiber precursor; and performing a calcination step on the carbon fiber precursor, such that the carbon fiber is formed.

In some embodiments of the present disclosure, the manufacturing method for the carbon fiber further includes: diluting the oiling agent with water, such that a concentration of the oiling agent that is diluted is between 20 wt % and 35 wt %.

In some embodiments of the present disclosure, when carrying out a thermogravimetric analysis on the oiling agent in air, a weight of the oiling agent at a temperature of 273° C. to 277° C. is greater than 90% to 95% of an original weight of the oiling agent.

In some embodiments of the present disclosure, a weight of the oiling agent at a temperature of 428° C. to 432° C. is greater than 80% to 85% of the original weight of the oiling agent.

In some embodiments of the present disclosure, during the oiling step, an oil attachment ratio of the oiling agent ranges from 0.5% to 0.8%.

In some embodiments of the present disclosure, the manufacturing method for a carbon fiber further includes: performing a mixing step that includes uniformly mixing γ-divinyltriamine propylmethyldimethoxyl silane and N-(β-aminoethyl)-γ-aminopropylmethylbimethoxy silane at a rotational speed of 300 rpm to 1000 rpm to form the silicone oil composition.

In some embodiments of the present disclosure, the mixing step is performed at a temperature of 50° C. to 65° C.

In some embodiments of the present disclosure, the emulsification step further includes: uniformly mixing the silicone oil composition, the emulsifier, and a deionized water to form the oiling agent, in which a weight ratio of the silicone oil composition, the emulsifier, and the deionized water is (12 to 40):(3 to 15):(45 to 85).

In some embodiments of the present disclosure, the emulsifier includes a nonionic surfactant, a cationic surfactant, an anionic surfactant, or combinations thereof.

In some embodiments of the present disclosure, the nonionic surfactant includes a block copolymer of polyoxyethylene ether and polyoxypropylene ether, a block copolymer of tristyrylphenol ethoxylates and ethylene oxide, a block copolymer of tristyrylphenol ethoxylates and propylene oxide, or combinations thereof.

According to the aforementioned embodiments of the present disclosure, the oiling agent of the present disclosure is used to manufacture carbon fibers, and the oiling agent includes γ-diethylenetriaminopropylmethyldimethoxysilane, and N-(β-aminoethyl)-γ-aminopropylmethyldimethoxysilane. Since γ-divinyltriamine propylmethyldimethoxyl silane and N-(β-aminoethyl)-γ-aminopropylmethylbimethoxy silane are both amine-modified silanes, the compatibility of γ-divinyltriamine propylmethyldimethoxyl silane and N-(β-aminoethyl)-γ-aminopropylmethylbimethoxy silane is high, which helps to improve the stability of the oiling agent, provide convenience in the manufacturing process, and provide the silicone oil composition with better hydrophilicity. On the other hand, since the oiling agent of the present disclosure can have good film-forming property and thermal resistance, the oiling agent can provide good protection under the premise of a small oil attachment ratio.

BRIEF DESCRIPTION OF THE DRAWINGS

The disclosure can be more fully understood by reading the following detailed description of the embodiments, with reference made to the accompanying drawings as follows.

DETAILED DESCRIPTION

Reference will now be made in detail to the present embodiments of the disclosure, examples of which are illustrated in the accompanying drawings. However, it should be understood that these details should not be intend to limit the present disclosure. That is, in some embodiments of the present disclosure, these practical details are unnecessary, and therefore should not be used to limit the present disclosure.

Figure 1:
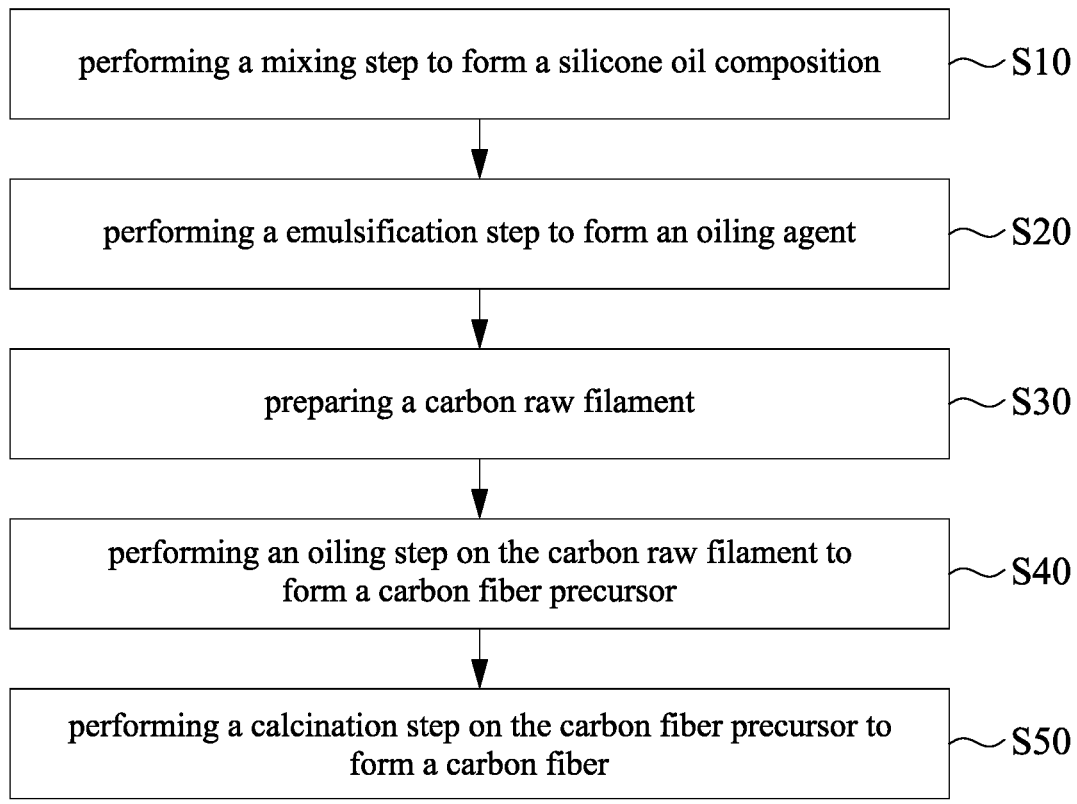
FIG. 1 is a flowchart illustrating a manufacturing method for a carbon fiber according to some embodiments of the present disclosure.

Please refer to FIG. 1, which is a flowchart illustrating a manufacturing method for a carbon fiber according to some embodiments of the present disclosure. The manufacturing method for the carbon fiber of the present disclosure includes steps S10 to S50. In step S10, a mixing step is performed to form a silicone oil composition. In step S20, an emulsification step is performed to form an oiling agent. In step S30, a carbon raw filament (protofilament) is prepared. In step S40, an oiling step is performed on the carbon raw filament to form a carbon fiber precursor. In step S50, the carbon fiber precursor is subjected to a calcination step to form a carbon fiber. In the following description, each of the above steps will be further explained.

First, in step S10, a mixing step is performed to uniformly mix a first amine-modified silicone oil and a second amine-modified silicone oil to form a silicone oil composition. The first amino-modified silicone oil includes γ-divinyltriamine propylmethyldimethoxyl silane, and the second amino-modified silicone oil includes N-(β-aminoethyl)-γ-aminopropylmethylbimethoxy silane. Since γ-divinyltriamine propylmethyldimethoxyl silane and N-(β-aminoethyl)-γ-aminopropylmethylbimethoxy silane are both amine-modified silanes, the compatibility of γ-divinyltriamine propylmethyldimethoxyl silane and N-(β-aminoethyl)-γ-aminopropylmethylbimethoxy silane is high, which helps to improve the overall stability of the silicone oil composition, and can provide convenience in the manufacturing process (for example, when the silicone oil composition is used to form the oiling agent, the choice of an emulsifier is more diverse, this will be further explained later in the following description). In addition, since γ-diethylenetriaminopropylmethyldimethoxysilane and N-(β-aminoethyl)-γ-aminopropylmethyldimethoxysilane are both amine-modified silanes, the silicone oil composition can have better hydrophilicity, such that after the oiling agent is formed by a emulsification step, the oiling agent can be adhered to the surface of the carbon raw filament without the use of organic solvent with strong volatility and high flammability for dissolving the silicone oil composition, which can improve the safety of the manufacturing process.

In some embodiments, a weight ratio of the first amine-modified silicone oil to the second amine-modified silicone oil may be between 7:3 and 8:2, so as to improve the film-forming property and the thermal stability of the subsequently formed oiling agent. In detail, if the above weight ratio is less than 7:3 (for example, 6:4), the thermal stability of the oiling agent may be poor, which is not conducive to protecting the carbon raw filament; if the above weight ratio is greater than 8:2 (for example, 9:1), it may lead to a poor film-forming property of the oiling agent, which is not conducive to adhering the oiling agent to the surface of the carbon raw filament. In some embodiments, the first amine-modified silicone oil and the second amine-modified silicone oil can be stirred at a rotational speed of 300 rpm to 1000 rpm, such that the first amine-modified silicone oil and the second amine-modified silicone oil are uniformly mixed. In detail, if the above-mentioned rotational speed is less than 300 rpm, it may cause uneven mixing, thereby affecting the protective ability of the oiling agent; if the above-mentioned rotational speed is greater than 1000 rpm, it may cause unnecessary heat generation, resulting in the first amine-modified silicone oil and the second amine-modified silicone oil to deteriorate. In some embodiments, the mixing step may be performed at a temperature of 50° C. to 65° C. for 60 minutes to 90 minutes to ensure that the first amine-modified silicone oil and second amine-modified silicone oil are thoroughly mixed.

Next, in step S20, an emulsification step is performed, and the silicone oil composition formed in step S10, an emulsifier, and deionized water are uniformly mixed to form an oiling agent. The addition of the emulsifier can improve the hydrophilicity of the silicone oil composition, such that the silicone oil composition can be fully mixed with the deionized water. In some embodiments, a weight ratio of the silicone oil composition, the emulsifier, and the deionized water may be (12 to 40):(3 to 15):(45 to 85), so as to achieve a better mixing/emulsification effect. In some embodiments, the emulsifier may include a nonionic surfactant, a cationic surfactant, an anionic surfactant, or combinations thereof. In some preferred embodiments, the emulsifier may include the nonionic surfactant. The nonionic surfactant used in the present disclosure includes a block copolymer of polyoxyethylene ether and polyoxypropylene ether, a block copolymer of tristyrylphenol ethoxylates and ethylene oxide, a block copolymer of tristyrylphenol ethoxylates and propylene oxide, or combinations thereof. The above-mentioned nonionic surfactant can preferably emulsify the silicone oil composition that includes the silane modified by the amine group with the deionized water. After the step S20 is completed, the oiling agent of the present disclosure can be obtained. In some embodiments, acetic acid, citric acid, or a combination thereof may be further added to the oiling agent to control the pH value of the oiling agent to be below 7, thereby ensuring the stability of the oiling agent.

Subsequently, in step S30, a carbon raw filament is prepared, in which step S30 may include steps S32 to S36. First, in step S32, a first monomer and a second monomer are dissolved in a solvent, and a polymerization reaction is performed to obtain a copolymerized polymer. In some embodiments, the first monomer includes acrylonitrile and the second monomer has an unsaturated bond. Specifically, the second monomer may be, for example, acrylic acid, methacrylic acid, acrylamide, methyl acrylate, methyl methacrylate, ethyl acrylate, n-butyl acrylate, isobutyl acrylate, vinyl acetate, ethyl methacrylate, isopropyl methacrylate, isobutyl acrylate, n-butyl methacrylate, n-hexyl methacrylate, cyclohexyl methacrylate, 2-hydroxyethyl methacrylate, vinyl bromide, itaconic acid, citric acid, maleic acid, mesaconic acid, crotonic acid, styrene, vinyl chloride, vinyl fluoride, vinylidene chloride, vinylidene fluoride, vinyltoluene, allylsulfonic acid, styrene sulfonic acid, or an amine salt or an ester derivative of any of the above compounds. In some embodiments, considering the solubility of the copolymer in the solvent, the compactness of the fibers, and the function of promoting oxidation reaction in the stabilization process, the second monomer may preferably be itaconic acid, for example.

In some embodiments, based on 100 wt % of the first monomer and the second monomer, a content of the first monomer may be between 95 wt % and 100 wt %, that is, a content of the second monomer may be less than 5 wt %. In the above content range, the first monomer has a high content, such that the carbon fiber precursor formed subsequently can be free from defects during the subsequent calcination step, so as to improve the mechanical strength of the carbon fiber. In detail, when the content of the first monomer is less than 95 wt %, it may cause the carbon fiber precursor to lose too much mass during the calcination step, and easily lead to the generation of defects on the carbon fiber precursor. In some preferred embodiments, based on 100 wt % of the first monomer and the second monomer, a content of the first monomer may be between 99 wt % and 100 wt %, that is, a content of the second monomer may be less than 1 wt %, so as to better achieve the above efficacy, such that the carbon fiber has better mechanical strength.

Next, in step S34, a spinning step is performed to form nascent carbon fibers. Specifically, the spinning step may include a reeling-off step and a condensing step in sequence. First, the copolymerized polymer can be dissolved in a solvent with a suitable concentration to form a spinning solution, and then the spinning solution can be subjected to a spinning step to form a filamentous copolymerized polymer. In this step, the solvent may be an organic solvent such as dimethylformamide, dimethylacetamide, dimethyl sulfoxide, or combinations thereof. In some other embodiments, the solvent may be, for example, an aqueous solution of inorganic salts such as zinc dichloride, sodium thiocyanate, or a combination thereof. In order to prevent the residual metal from affecting the physical properties of the carbon fiber, the solvent is preferably dimethyl sulfoxide. In some embodiments, a weight percent concentration of the copolymerized polymer in the second solvent may be between 18% and 25%, so as to facilitate the spinning step to form the filamentous copolymerized polymer with appropriate compactness. In detail, when the weight percent concentration of the copolymerized polymer in the solvent is less than 18%, the spinning solution cannot withstand high-degree drafting, and the filamentous copolymerized polymer obtained by spinning has a loose structure, which leads to low mechanical strength of the carbon fiber; and when the weight percent concentration of the copolymerized polymer in the solvent is greater than 25%, the solvent has insufficient dissolving ability to the copolymerized polymer, resulting in poor uniformity and high viscosity of the spinning solution, which further causes some spinning problems such as low fluidity of the spinning solution, which is not conducive to the stability of the spinning step.

Next, a process of dry-jetting wet-spinning or wet-jetting wet-spinning can be carried out to perform a condensing step on the filamentous copolymerized polymer, such that a nascent carbon fiber is formed. Specifically, the condensing step can be performed on the filamentous copolymerized polymer by using a condensing bath, so as to spit out the nascent carbon fiber in the condensing bath. By adjusting the concentration of the condensing liquid in the condensing bath, the temperature of the condensing step (the temperature of the condensing liquid), the pulling tension and the draft ratio at the outlet of the condensing bath, etc., the pore size of the pore in the nascent carbon fiber can be controlled. In some embodiments, the condensing solution may include an aqueous solution dissolving dimethyl sulfoxide, and based on 100 wt % of the condensing solution, a content of dimethyl sulfoxide is between 20 wt % and 50 wt %. In detail, when the content of dimethyl sulfoxide is less than 20 wt %, the precipitation of the filamentous copolymerized polymer from the condensing solution may be too fast, resulting in a loose structure and a large surface pore size of the nascent carbon fiber; when the content of dimethyl sulfoxide is greater than 50 wt %, the condensing of the filamentous copolymerized polymer in the condensing solution may be too slow, resulting in the failure of the nascent carbon fiber to be fully condensed, such that the nascent carbon fibers are stuck (adhered) together during subsequent steps such as washing and drafting. In some embodiments, the temperature of the condensing step may be between 0° C. and 40° C., so as to improve the compactness of the nascent carbon fibers and control the pore size of the nascent carbon fiber to be within a suitable range. In detail, when the condensing temperature is less than 0° C., the pore size of the nascent carbon fiber may be smaller than the target range; when the condensing temperature is higher than 40° C., the structure of the nascent carbon fiber may be too loose, which is not conducive to the formation of the carbon fiber with high mechanical strength.

Subsequently, in step S36, a washing bath may be used to perform a (water) washing step on the nascent carbon fiber. By adjusting the concentration of the washing solution in the washing bath, the temperature of the washing step (the temperature of the washing solution), and other conditions, the adhesion of single fibers can be avoided, and the pore size of the nascent carbon fiber can be controlled. In some embodiments, the washing bath may include an aqueous solution (also known as a washing solution) dissolving dimethyl sulfoxide, and based on 100 wt % of the aqueous solution, a content of dimethyl sulfoxide may be between 0 wt % and 25 wt %. In some embodiments, a temperature of the washing step can be between 70° C. and 90° C., and when a multi-stage washing step is carried out, the temperature of the last stage of the washing step can be further increased to be between 90° C. and 95° C. In some preferred embodiments, in order to avoid the remaining solvent to form unnecessary pores in the nascent carbon fiber, the temperature of the washing step is preferably 100° C. (i.e., the washing solution is in a boiling state). In some embodiments, before the washing step, the nascent carbon fiber may be subjected to an drafting step to draft the nascent carbon fiber by applying an draft ratio of 2 to 5 times. Specifically, the drafting step can be performed by stretching the nascent carbon fiber in a high-temperature hot roller, a high-temperature hot plate, or a high-temperature and high-pressure steam. In some preferred embodiments, a multi-stage drafting step and a multi-stage washing step may be performed, and the multi-stage drafting step and the multi-stage washing step may be performed, for example, alternately. After completing step S30 (including steps S32 to S36), the carbon raw filament can be obtained.

Next, in step S40, the carbon raw filament is soaked in the oiling agent, such that the oiling agent adheres to the surface of the carbon raw filament, so as to form a carbon fiber precursor. In some embodiments, after the carbon raw filament is soaked in the oiling agent and taken out, the oiling agent can completely cover the carbon raw filament, that is, all surfaces of the carbon raw filament can be completely spared from being exposed. In some embodiments, the oiling agent can be diluted with water, and the concentration of the diluted oiling agent can be between 20 wt % and 35 wt %, such that the oiling agent has suitable fluidity. In some embodiments, the oil attachment ratio of the oiling agent may be between 0.5% and 0.8%, so as to ensure that the oiling agent fully covers the surface of the carbon raw filament and avoid waste of the oiling agent. In detail, when the oiling attachment ratio of the oiling agent is less than 0.5%, it may not be possible to ensure that the oiling agent fully covers the surface of the carbon raw filament, resulting in insufficient protection of the oiling agent to the carbon raw filament; when the oil attachment ratio of the oiling agent is greater than 0.8%, it may affect the subsequent process due to the excessive amount of oiling agent, and also cause the waste of the oiling agent. On the other hand, since the oiling agent of the present disclosure can have good film-forming property and thermal resistance, the oiling agent can provide good protection under the premise of a small (between 0.5% and 0.8%) oil attachment ratio. After step S40 is completed, the carbon fiber precursor can be obtained.

Figure 2:
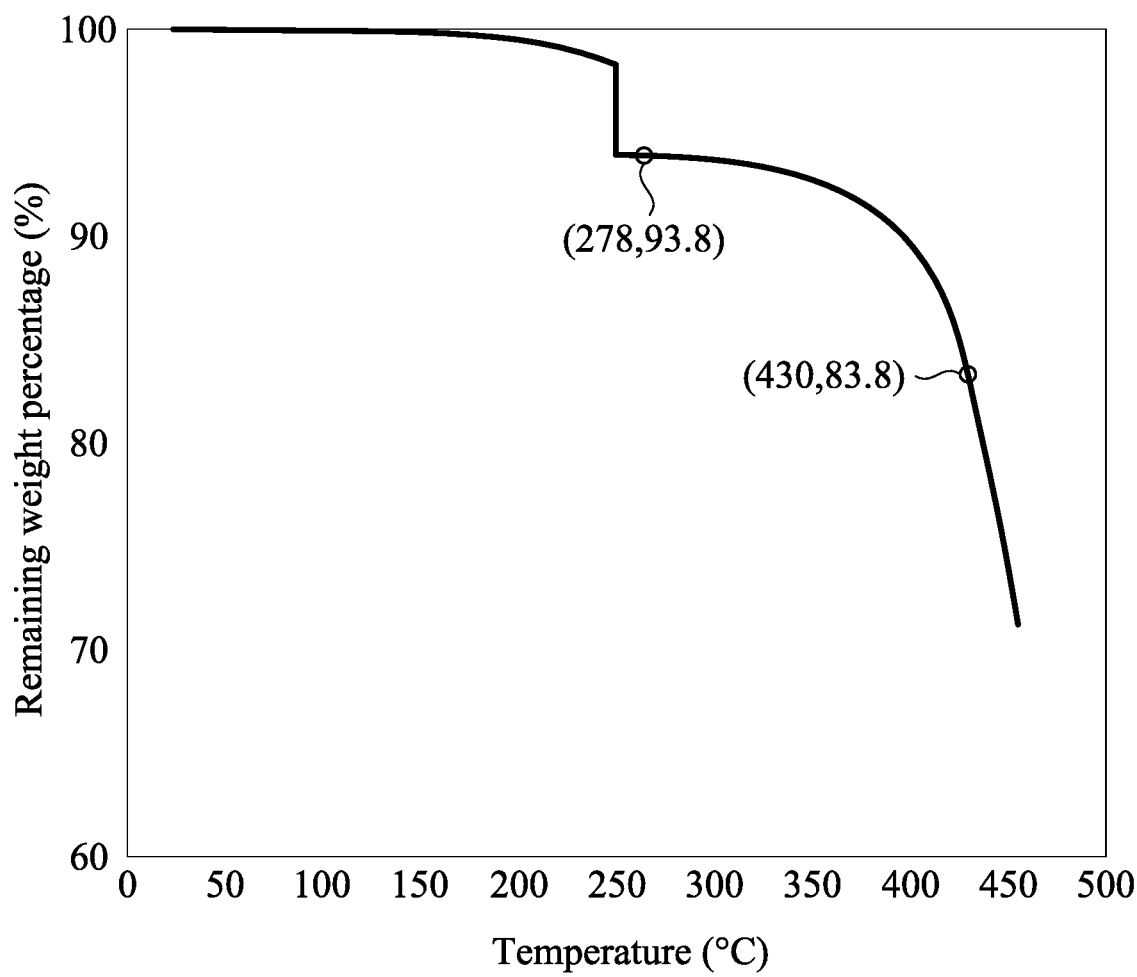
FIG. 2 shows the results of the thermogravimetric analysis of an oiling agent according to some embodiments of the present disclosure.

Please refer to FIG. 2, which shows the results of the thermogravimetric analysis of an oiling agent according to some embodiments of the present disclosure. In more detail, the results of thermogravimetric analysis of the oiling agent were carried out in air using Mettler STARE System TGA2 measuring instrument, and the temperature was raised from 25° C. to 250° C. at a rate of 10° C./min, and stayed for half an hour, and then the temperature was raised to 455° C. at a rate of 10° C./min. From the thermogravimetric analysis results in FIG. 2, it can be seen that when the temperature is 273° C. to 277° C. (for example, 275° C.), the weight of the oiling agent is greater than 90% to 95% (for example, 93.8%) of the original weight of the oiling agent; and when the temperature is 428° C. to 432° C. (for example, 430° C.), the weight of the oiling agent is greater than 80% to 82% of the original weight of the oiling agent. In other words, the oiling agent prepared by the manufacturing method of the present disclosure can have excellent heat resistance at high temperature to form good protection for the carbon raw filament, such that subsequent steps such as calcination and drafting can be well performed.

Subsequently, in step S50, a calcination step is performed on the carbon fiber precursor to form the carbon fiber. The calcination step can be performed in a manner known in the industry, for example, it sequentially includes four steps, which are stabilization, carbonization, surface treatment, and starching steps. Specifically, the stabilization step is to make the carbon fiber precursor react in the air with an appropriate tension and a temperature of 200° C. to 300° C., and the fiber density of the carbon fiber precursor after the stabilization step can be between 1.3 g/cm$^3$ 1.4 g/cm$^3$; the carbonization step is to carbonize the carbon fiber precursor at a high temperature in a high-temperature inert gas, so as to improve the mechanical strength of the carbon fiber, the carbonization temperature can be between 1000° C. and 2000° C., and can further be between 2000° C. and 2500° C. for graphitization as deemed necessary; the surface treatment step can improve the bonding ability of carbon fiber and resin, which includes chemical grafting, plasma, electrolysis, ozone treatments, etc., preferably plasma treatment; the starching step is to wash and dry the carbon fiber precursor after surface treatment, and then to make the slurry adhere to the surface of the carbon fiber precursor by means of dipping, such that the carbon fiber has good wear resistance, aggregation, and other protective effects. After the step S50 is completed, the carbon fiber with high mechanical strength of the present disclosure can be obtained.

The features and effects of the present disclosure will be described in more detail below with reference to the carbon fibers of each embodiment and each comparative example. It should be understood that the materials used, their amounts and ratios, processing details and processing flow, etc. may be appropriately changed without departing from the scope of the present disclosure. Therefore, the present disclosure should not be limited by the embodiments described below. The detailed description of each embodiment and each comparative example is as follows.

The manufacturing method for the carbon fiber of each embodiment and each comparative example includes the following steps. 98 wt % of acrylonitrile was used as the first monomer and 2 wt % of itaconic acid was used as the second monomer to carry out a polymerization reaction in dimethyl sulfoxide to form a copolymerized polymer. After the solution containing 22 wt % of the copolymerized polymer (spinning solution) was spit out from the spinning nozzle in the air, the nascent carbon fiber was formed in a condensing bath with an aqueous solution of 35 wt % of dimethyl sulfoxide. After the washing step for the nascent carbon fiber was performed, the drafting step with a total draft ratio of 3.5 times was carried out through two stages in boiling water, such that the carbon raw filament was formed. The carbon raw filament was oiled in an oil tank with the oiling agent. The carbon raw filament that has been oiled was dried and densified with a hot roller at a temperature of 175° C. The carbon raw filament was subjected to an drafting step of with an draft ratio of 3.5 times in high pressure steam, thereby forming a carbon fiber precursor. The carbon fiber precursor was gradually heated from 240° C. to 300° C. in the air, and the speed ratio of the front and rear traction rollers was controlled to be 1.0 to perform the stabilization step under the condition of maintaining the tension of the carbon fiber precursor, and the fiber density of the stabilized carbon fiber precursor is 1.35 g/cm$^3$. The stabilized carbon fiber precursor was gradually heated up from 300° C. to 800° C. in nitrogen, and the speed ratio of the front and rear traction rollers was controlled to be 0.9 for low-temperature carbonization, and then the temperature was gradually raised from 900° C. to 1800° C., and the speed ratio of the front and rear traction rollers was controlled to be 0.95 for high-temperature carbonization. An electrolytic surface treatment was performed on the carbonized carbon fiber precursor. The surface-treated carbon fiber precursor was washed with water, dried and starched, such that the carbon fiber was obtained. The detailed ingredients in the oiling agent are described in the following.

In the oiling agent of each embodiment, the first amine-modified silicone oil was γ-diethylenetriaminopropylmethyldimethoxysilane, the second amine-modified silicone oil was N-(β-aminoethyl)-γ-aminopropylmethyldimethoxysilane, and the emulsifier was a block copolymer of tristyrylphenol ethoxylates and ethylene/propylene oxide. In each comparative example, an amino-modified polydimethylsiloxane which was poly[3-((2-aminoethyl)amino)propyl] dimethylsiloxane (also referred to as the first siloxane) is mixed with an epoxy modified polydimethylsiloxane which was 1,2-epoxycyclohexyl-modified polydimethylsiloxane (also referred to as the second siloxane) to form a silicone oil composition, and the emulsifier was aliphatic alcohol polyoxyethylene ether. The content of each ingredient is shown in Table 1.

TABLE 1

| | silicone oil composition | | |
|---|---|---|---|
| | first amine-modified silicone oil/ first siloxane (part by weight) | second amine-modified silicone oil/ second siloxane (part by weight) | silicone oil composition: emulsifier: deionized water (weight ratio) |
| Comparative Example 1 | 7 | 3 | 24:7:69 |
| Comparative Example 2 | 7.5 | 2.5 | 22:8:70 |
| Embodiment 1 | 8 | 2 | 26:4:70 |
| Embodiment 2 | 7 | 3 | 30:5:65 |

Note 1:
The oiling agents in the embodiments and comparative examples were diluted, and their concentration ranges from 30 wt % to 40 wt %.

<Experiment 1: Test of Oil Attachment Ratio and Remaining Weight of Oiling Agent>

In this experiment, a Soxhlet distiller was used to extract the carbon raw filament, in which 10 g of the carbon raw filament containing the oiling agent was taken each time, acetone was heated to a boiling solvent for extraction, and the extraction time was 4 hours. The remaining weight in the bottle was calculated to obtain the oil attachment ratio. The remaining weight of the oiling agent was recorded by the system using TGA (Thermogravimetric Analyzer), in which the oiling agent was heated to 275° C. and 430° C. The results are shown in Table 2.

TABLE 2

| | oiling agent (275° C.) remaining weight (%) | oiling agent (430° C.) remaining weight (%) | oil attachment ratio (%) |
|---|---|---|---|
| Comparative Example 1 | 90.0 | 73.6 | 0.80 |
| Comparative Example 2 | 90.9 | 71.4 | 1.10 |
| Embodiment 1 | 93.8 | 83.8 | 0.79 |
| Embodiment 2 | 93.2 | 83.5 | 0.68 |

As can be seen from the results, the oil attachment ratio of the oiling agent of the present disclosure can be maintained in the range of 0.5% to 0.8%, to ensure that the oiling agent fully covers the surface of the carbon raw filament, and in the case of low oil attachment ratio, the usage and cost of oiling agent can be reduced.

<Experiment 2: Test of Mechanical Strength on Carbon Fiber>

In this experiment, the standard method ASTM D4018-99 was used to test the strength of carbon fiber in each embodiment and each comparative example, and the results are shown in Table 3.

TABLE 3

| | mechanical strength (MPa) |
|---|---|
| Comparative Example 1 | 5408 |
| Comparative Example 2 | 5300 |
| Embodiment 1 | 5830 |
| Embodiment 2 | 5750 |

It can be seen from the results of Embodiment 1 and 2 that the oiling agent of the present disclosure can achieve a better protection effect on the carbon raw filament under a relatively low oil attachment ratio, such that the carbon fiber finally produced has a higher mechanical strength, and the cost of oiling agent can be effectively reduced.

According to the aforementioned embodiments of the present disclosure, the oiling agent of the present disclosure is used to manufacture carbon fibers, and the oiling agent includes γ-diethylentriaminopropylmethyldimethoxysilane, and N-(β-aminoethyl)-γ-aminopropylmethyldimethoxysilane. Since γ-divinyltriamine propylmethyldimethoxyl silane and N-(β-aminoethyl)-γ-aminopropylmethylbimethoxy silane are both amine-modified silanes, the compatibility of γ-divinyltriamine propylmethyldimethoxyl silane and N-(β-aminoethyl)-γ-aminopropylmethylbimethoxy silane is high, which helps to improve the stability of the oiling agent, provide convenience in the manufacturing process, and provide the silicone oil composition with better hydrophilicity. On the other hand, since the oiling agent of the present disclosure can have good film-forming property and thermal resistance, the oiling agent can provide good protection under the premise of a small oil attachment ratio.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure covers modifications and variations of this disclosure provided they fall within the scope of the following claims.

What is claimed is:

1. A manufacturing method for a carbon fiber, comprising: performing an emulsification step that comprises uniformly mixing a silicone oil composition and an emulsifier to form an oiling agent, wherein the silicone oil composition comprises γ-divinyltriamine propylmethyldimethoxyl silane and N-(β-aminoethyl)-γ-aminopropylmethylbimethoxy silane;
performing an oiling step that comprises soaking a carbon raw filament in the oiling agent, such that the oiling agent is adhered to a surface of the carbon raw filament to form a carbon fiber precursor;
performing a calcination step on the carbon fiber precursor, such that the carbon fiber is formed, and
carrying out a thermogravimetric analysis on the oiling agent in air, a weight of the oiling agent at a temperature of 273° C. to 277° C. is greater than 90% to 95% of an original weight of the oiling agent.

2. The manufacturing method for the carbon fiber of claim 1, wherein a weight ratio of the γ-divinyltriamine propylmethyldimethoxyl silane and the N-(β-aminoethyl)-γ-aminopropylmethylbimethoxy silane ranges from 7:3 to 8:2.

3. The manufacturing method for the carbon fiber of claim 1, wherein a weight of the oiling agent at a temperature of 428° C. to 432° C. is greater than 80% to 85% of the original weight of the oiling agent.

4. The manufacturing method for the carbon fiber of claim 1, wherein during the oiling step, an oil attachment ratio of the oiling agent ranges from 0.5% to 0.8%.

5. The manufacturing method for the carbon fiber of claim 1, further comprising:
performing a mixing step that comprises uniformly mixing the γ-divinyltriamine propylmethyldimethoxyl silane and the N-(β-aminoethyl)-γ-aminopropylmethylbimethoxy silane at a rotational speed of 300 rpm to 1000 rpm to form the silicone oil composition.

6. The manufacturing method for the carbon fiber of claim 5, wherein the mixing step is performed at a temperature of 50° C. to 65° C.

7. The manufacturing method for the carbon fiber of claim 1, wherein the emulsification step further comprises:
uniformly mixing the silicone oil composition, the emulsifier, and a deionized water to form the oiling agent, wherein a weight ratio of the silicone oil composition, the emulsifier, and the deionized water is (12 to 40):(3 to 15):(45 to 85).

8. The manufacturing method for the carbon fiber of claim 1, wherein the emulsifier comprises a nonionic surfactant, a cationic surfactant, an anionic surfactant, or combinations thereof.

9. The manufacturing method for the carbon fiber of claim 8, wherein the nonionic surfactant comprises a block copolymer of polyoxyethylene ether and polyoxypropylene ether, a block copolymer of tristyrylphenol ethoxylates and ethylene oxide, a block copolymer of tristyrylphenol ethoxylates and propylene oxide, or combinations thereof.

* * * * *